US011965514B2

United States Patent

(12) Joly et al.

(10) Patent No.: US 11,965,514 B2
(45) Date of Patent: Apr. 23, 2024

(54) AXIAL AND DOWNSTREAM COMPRESSOR ASSEMBLY

(71) Applicant: Carrier Corporation, Palm Beach Gardens, FL (US)

(72) Inventors: Michael M. Joly, Palm Beach Gardens, FL (US); Chaitanya Vishwajit Halbe, Palm Beach Gardens, FL (US); Vishnu M. Sishtla, Palm Beach Gardens, FL (US); William T. Cousins, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/622,941

(22) PCT Filed: Jul. 20, 2020

(86) PCT No.: PCT/US2020/042759
§ 371 (c)(1),
(2) Date: Dec. 27, 2021

(87) PCT Pub. No.: WO2021/025851
PCT Pub. Date: Feb. 11, 2021

(65) Prior Publication Data

US 2022/0228593 A1 Jul. 21, 2022

Related U.S. Application Data

(60) Provisional application No. 62/883,775, filed on Aug. 7, 2019.

(51) Int. Cl.
*F04D 17/02* (2006.01)
*F04D 19/02* (2006.01)
(Continued)

(52) U.S. Cl.
CPC ......... *F04D 17/025* (2013.01); *F04D 19/024* (2013.01); *F04D 25/02* (2013.01);
(Continued)

(58) Field of Classification Search
CPC ...... F04D 17/025; F04D 19/024; F04D 25/02; F04D 29/321; F04D 29/284; F04D 17/02;
(Continued)

(56) References Cited

U.S. PATENT DOCUMENTS 3,795,458 A * 3/1974 Strub .................. F04D 29/5826 415/149.2
3,892,499 A * 7/1975 Strub .................... F04D 17/025 417/372

(Continued)

FOREIGN PATENT DOCUMENTS

EP 0887557 12/1998
GB 671607 5/1952

(Continued)

OTHER PUBLICATIONS

International Search Report and Written Opinion for PCT/US2020/042759 dated Oct. 19, 2020.

*Primary Examiner* — Bryan M Lettman
(74) *Attorney, Agent, or Firm* — Carlson, Gaskey & Olds, P.C.

(57) ABSTRACT

A refrigerant compressor assembly (20A, 20B, 20C) includes an axial compressor (22B, 22C, 22) that includes at least one axial stage. A downstream compressor (24) is located fluidly downstream of the axial compressor (22B, 22C, 22) and includes one of a mixed-flow impeller (46) or a centrifugal impeller (96). At least one motor (26, 27) is in driving engagement with at least one of the axial compressor (22B, 22C, 22) and the downstream compressor (24).

16 Claims, 8 Drawing Sheets

(51) Int. Cl.
*F04D 25/02* (2006.01)
*F04D 29/28* (2006.01)
*F04D 29/32* (2006.01)

(52) U.S. Cl.
CPC .......... *F04D 29/321* (2013.01); *F04D 29/284* (2013.01); *F05D 2210/14* (2013.01); *F05D 2250/51* (2013.01)

(58) Field of Classification Search
CPC ...... F04D 19/02; F04D 19/028; F04D 19/026; F05D 2210/14; F05D 2250/51
See application file for complete search history.

(56) References Cited

U.S. PATENT DOCUMENTS

| | | | | |
|---|---|---|---|---|
| 5,520,008 | A * | 5/1996 | Ophir | F25B 30/02<br>416/185 |
| 6,012,897 | A * | 1/2000 | Sabnis | F04D 27/02<br>415/68 |
| 2010/0239410 | A1* | 9/2010 | Nikpour | F04D 27/0207<br>415/182.1 |
| 2014/0341710 | A1* | 11/2014 | Creamer | F04D 27/001<br>415/203 |
| 2016/0333886 | A1* | 11/2016 | Andersen | F04D 29/321 |
| 2017/0159665 | A1* | 6/2017 | Bergamini | F04D 31/00 |
| 2018/0249873 | A1 | 9/2018 | Yoshida | |
| 2019/0285085 | A1* | 9/2019 | Cousins | F04D 13/0646 |
| 2020/0173464 | A1* | 6/2020 | Oh | F04D 17/10 |

FOREIGN PATENT DOCUMENTS

| | | | |
|---|---|---|---|
| WO | 2013141912 | | 9/2013 |
| WO | WO 2013/141912 | * | 9/2013 |
| WO | 2018038818 | | 3/2018 |

* cited by examiner

AXIAL AND DOWNSTREAM COMPRESSOR ASSEMBLY

CROSS-REFERENCE TO RELATED APPLICATIONS

This application claims priority to U.S. Provisional Application No. 62/883,775, which was filed on Aug. 7, 2019 and is incorporated herein by reference.

BACKGROUND

The disclosure herein relates generally to a compressor assembly, and more particularly, to an axial flow compressor and a downstream compressor for a refrigeration system.

Rotary machines, such as compressors, are commonly used in refrigeration and turbine applications. One example of a rotary machine used in refrigeration systems includes a centrifugal compressor having an impeller fixed to a rotating shaft. Rotation of the impeller increases a pressure and/or velocity of a fluid or gas moving across the impeller. However, other types of compressors are also used in refrigeration systems.

SUMMARY

In one exemplary embodiment, a refrigerant compressor assembly includes an axial compressor that includes at least one axial stage. A downstream compressor is located fluidly downstream of the axial compressor and includes one of a mixed-flow impeller or a centrifugal impeller. At least one motor is in driving engagement with at least one of the axial compressor and the downstream compressor.

In a further embodiment of any of the above, the at least one axial stage is a vaned stage that includes a rotor and a stator.

In a further embodiment of any of the above, the axial compressor includes at least one axial stage.

In a further embodiment of any of the above, a transmission mechanically connects the at least one axial stage and the at least one motor.

In a further embodiment of any of the above, the at least one axial stage includes a first vaneless stage immediately upstream of a second vaneless stage.

In a further embodiment of any of the above, the first vaneless stage is configured to rotate in a first rotational direction. The second vaneless stage is configured to rotate in a second rotational direction.

In a further embodiment of any of the above, that at least one motor includes a first motor for driving the first vaneless stage and a second motor for driving the second vaneless stage.

In a further embodiment of any of the above, the second motor drives the downstream compressor.

In a further embodiment of any of the above, the downstream compressor is a mixed-flow compressor. The mixed-flow impeller includes a hub and a plurality of impeller blades that extend outward from the hub.

In a further embodiment of any of the above, the mixed-flow compressor includes a diffuser downstream of the mixed-flow impeller.

In a further embodiment of any of the above, the diffuser includes at least one row of circumferentially spaced diffuser vanes.

In a further embodiment of any of the above, the diffuser includes a first row of circumferentially spaced diffuser vanes. A second row of circumferentially space diffuser vanes are located axially downstream of the first row of circumferentially spaced diffuser vanes.

In another exemplary embodiment, a method of operating a refrigerant compressor assembly includes the step of compressing a refrigerant with an axial compressor including at least one axial stage. The refrigerant is compressed with a downstream compressor located fluidly downstream of the axial compressor. The downstream compressor includes one of a mixed-flow impeller or a centrifugal impeller.

In a further embodiment of any of the above, the axial compressor includes at least a first vaneless stage and a second vaneless stage.

In a further embodiment of any of the above, the method includes driving the first vaneless stage in a first rotational direction with a first motor. The second vaneless stage is driven in a second rotational direction with a second motor.

In a further embodiment of any of the above, the downstream compressor is driven by the second motor.

In a further embodiment of any of the above, the downstream compressor is a mixed-flow compressor. The refrigerant exiting the mixed-flow impeller is diffused with a diffuser.

In a further embodiment of any of the above, the diffuser includes at least one row of circumferentially spaced diffuser vanes.

In a further embodiment of any of the above, a first axial stage of the at least one axial stage compresses the refrigerant with a pressure ratio of 1.2 to 2.0.

In a further embodiment of any of the above, the downstream compressor compresses the refrigerant with a pressure ratio of 2.0 to 6.5.

DETAILED DESCRIPTION

Figures 1A, 1B, 1C:
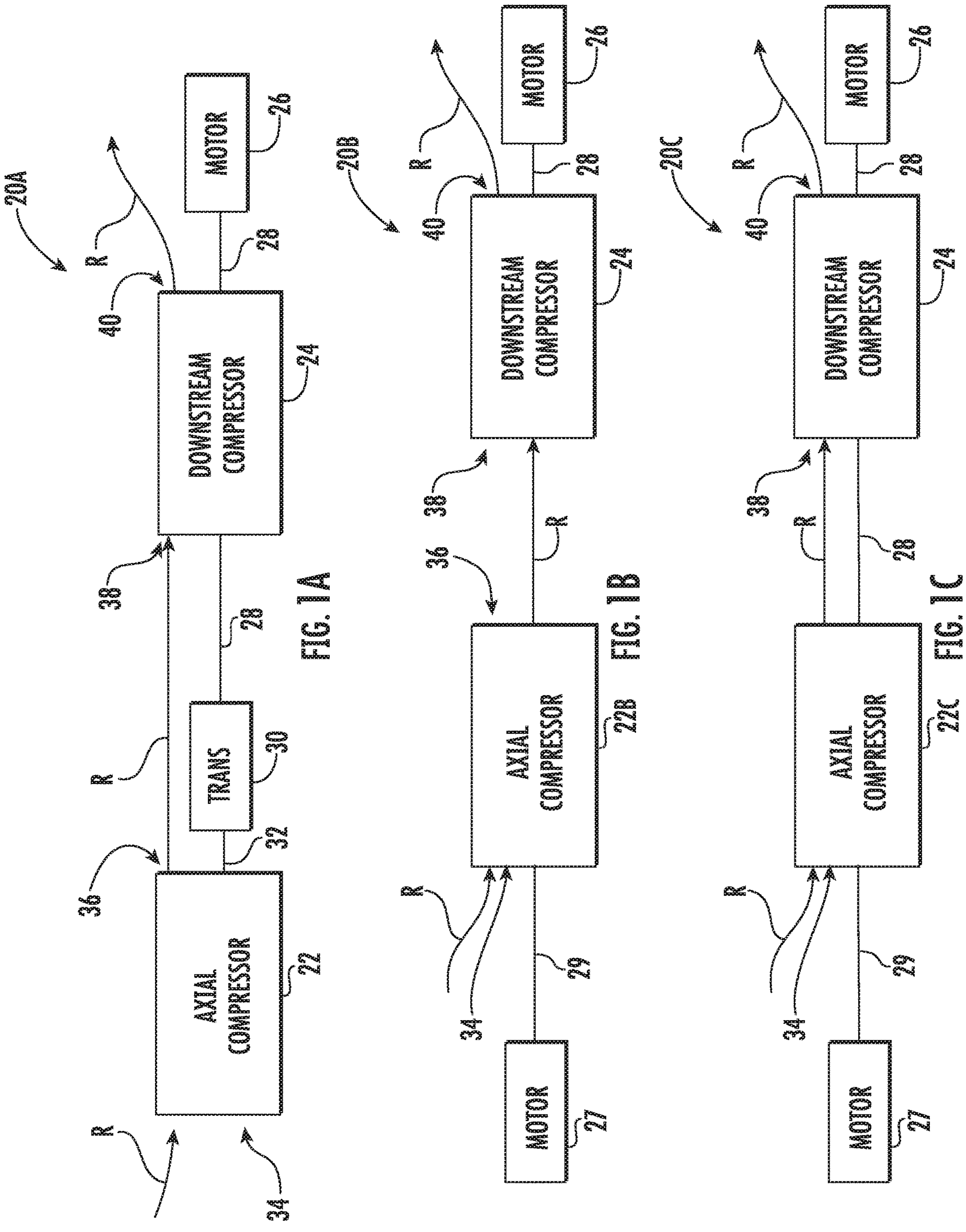
FIG. 1A schematically illustrates an example compression assembly for use in a refrigeration system.
FIG. 1B schematically illustrates another example compression assembly for use in the refrigerant system.
FIG. 1C schematically illustrates yet another example compression assembly for use in the refrigeration system.

FIG. 1A schematically illustrates an example compressor assembly 20A for use in a refrigeration system. In the illustrated example, the compressor assembly 20A includes an axial compressor 22 fluidly upstream of a downstream compressor 24, such as a mixed-flow compressor or a centrifugal compressor. A motor 26 directly drives the downstream compressor 24 through a driveshaft 28 and the motor 26 drives the axial compressor 22 through the driveshaft 28 connected to a transmission 30. In particular, the transmission 30 includes an input connected to the driveshaft 28 and an output connected to an axial driveshaft 32, which is mechanically coupled to the axial compressor 22. However, the driveshaft 28 could directly drive the axial compressor 22 without the use of the transmission 30 such that the axial compressor 22 and the downstream compressor 24 rotate in the same direction and at the same speed.

During operation of the compressor assembly 20A, refrigerant R is drawn into an inlet 34 on the axial compressor 22. Once the refrigerant R is compressed by the axial compressor 22, the refrigerant R travels through an outlet 36 on the axial compressor 22. From the outlet 36, the refrigerant R is directed to an inlet 38 on the downstream compressor 24 where the refrigerant R is further compressed in the downstream compressor 24 before being discharged through an outlet 40 on the downstream compressor 24. In the illustrated example, the axial compressor 22 includes a pressure ratio of 1.2 to 2.0 per stage and the downstream compressor 24 includes a pressure ratio of 2.0 to 6.5. Axial compressors can include vaned stages with a rotor and a stator forming a single stage as described below in relation to FIGS. 2A and 2B or vaneless stages without stators separating adjacent rotors as described below in relation to FIG. 2C.

FIG. 1B illustrates another example compressor assembly 20B similar to the compressor assembly 20A except where described below or shown in the Figures. The compressor assembly 20B includes a motor 27 driving the axial compressor 22B independently from the motor 26, which drives the downstream compressor 24. In the illustrated example, the motor 27 turns a drive shaft 29, which is mechanically coupled to the axial compressor 22B.

During operation of the compressor assembly 20B, the refrigerant R is drawn into the inlet 34 on the axial compressor 22B. Once the refrigerant R is compressed by the axial compressor 22B, the refrigerant R then travels through the outlet 36 on the axial compressor 22B. From the outlet 36, the refrigerant R is directed to the inlet 38 on the downstream compressor 24 where the refrigerant R is compressed in the downstream compressor 24 before being discharged through the outlet 40 on the downstream compressor 24.

FIG. 1C illustrates another example compressor assembly 20C similar to the compressor assembly 20B except where described below or shown in the Figures. The compressor assembly 20C includes the motor 27 for driving an upstream stage 50C in the axial compressor 22C through the driveshaft 29 while the motor 26 drives a downstream stage 54C of the axial compressor 22C and the downstream compressor 24 through the driveshaft 28 (FIG. 2C) and the motor 26. In the illustrated example, the driveshaft 29 and the driveshaft 28 could rotate in opposite directions.

During operation of the compressor assembly 20A, the refrigerant R is drawn into the inlet 34 on the axial compressor 22C. Once the refrigerant R is compressed by the axial compressor 22C, the refrigerant R then travels through the outlet 36 on the axial compressor 22C. From the outlet 36, the refrigerant R is directed to the inlet 38 on the downstream compressor 24 where the refrigerant R is compressed in the downstream compressor 24 before being discharged through the outlet 40 on the downstream compressor 24.

Figure 2A:
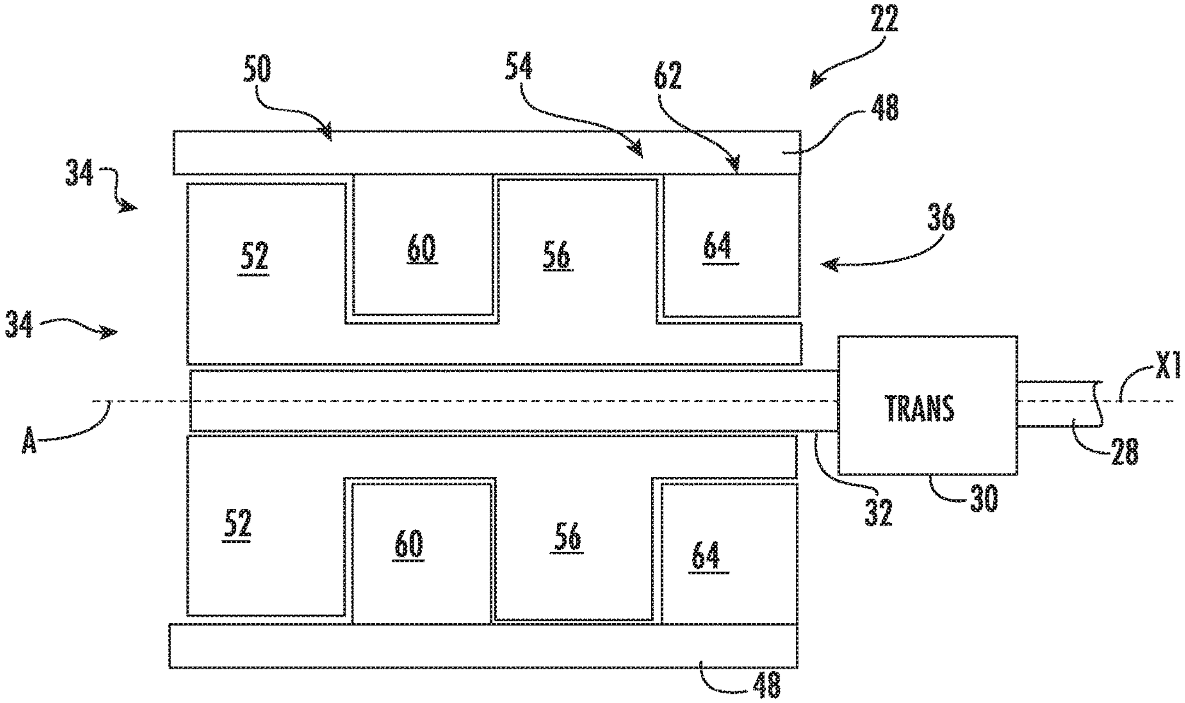
FIG. 2A schematically illustrates an example axial compressor for use with the compressor assembly of FIG. 1A.

FIG. 2A illustrates an example configuration of the axial compressor 22 with the transmission 30 shown in FIG. 1A. As shown in FIG. 2A, the axial compressor 22 includes a first vaned stage 50 and a second vaned stage 54. The first vaned stage 50 includes a set of circumferentially spaced rotor blades 52 defining a rotor and set of circumferentially spaced vanes 60 defining a stator. The second vaned stage 54 includes a set of circumferentially spaced rotor blades 56 defining a rotor and a set of circumferentially spaced vanes 64 defining a stator. Although the illustrated example shows two vaned stages 50, 54, the axial compressor 22 could include a single vaned stage or more than two vaned stages, such as three to five stages.

In the illustrated example, the transmission 30 may reverse the rotational direction and/or change the rotational speed of the drive shaft 28 such that the drive shaft 28 and the axial drive shaft 32 rotate in the same or opposite directions with equal or differing speeds. In one example, the transmission 30 is a constant ratio transmission and in another example, the transmission 30 is a variable ratio transmission. However, as discussed above, the transmission 30 could be eliminated such that the driveshaft 28 directly drives the axial compressor 22 without the axial drive shaft 32.

In the illustrated example, the rotor blades 52 are located at the inlet 34 and the vanes 64 are located at the outlet 36. The axial drive shaft 32 engages both the first and second vaned stages 50, 54 to drive the rotor blades 52, 56 in the same rotational direction and at the same speed about the axis of rotation A. Additionally, the axis of rotation A of the axial compressor 22 is coaxial with the axis of rotation X1 of the drive shaft 28. However, the axis of rotation A and the axis of rotation X1 could be parallel and not coaxial or the axis of rotation A could be transverse to the axis of rotation X1.

Figure 2B:
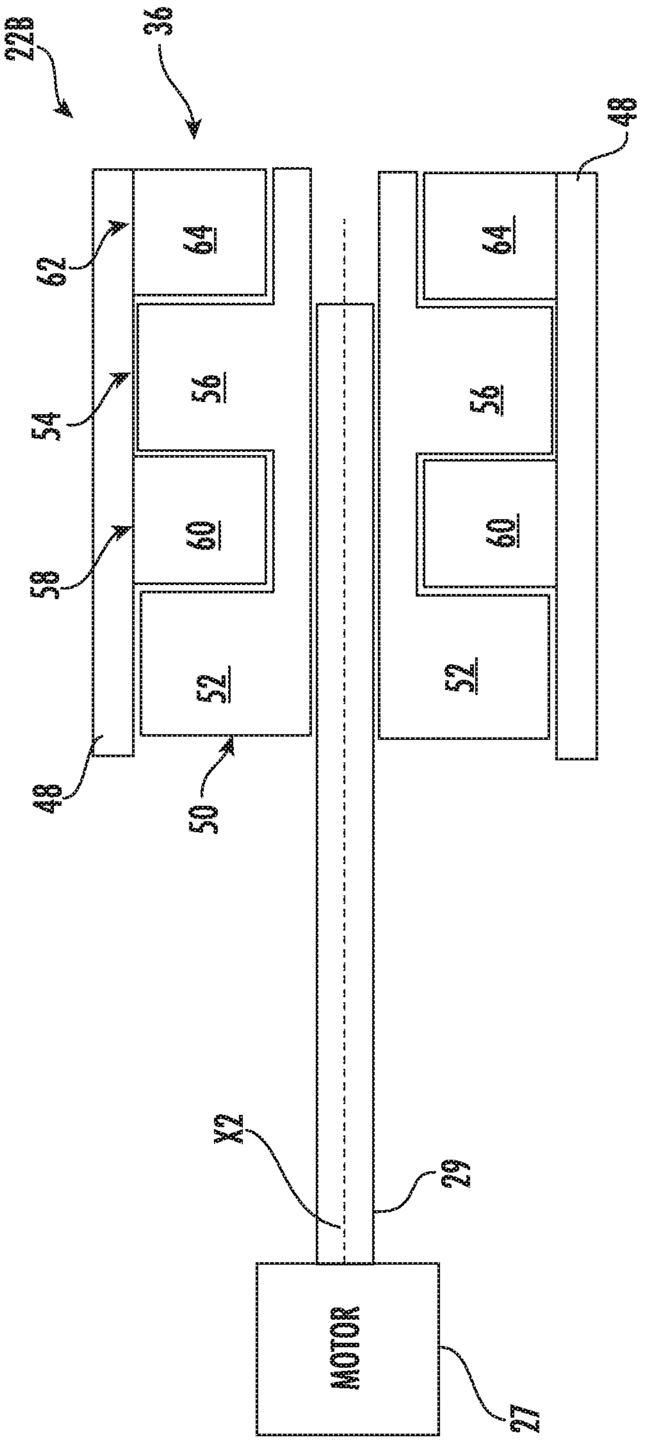
FIG. 2B schematically illustrates an example axial compressor for use with the compressor assembly of FIG. 1B.

FIG. 2B illustrates the axial compressor 22B located in the compressor assembly 20B and the motor 27 located on an upstream side of the axial compressor 22B. In the illustrated example, the motor 27 rotates the drive shaft 29 about an axis of rotation X2 to drive the axial compressor 22B independently from the motor 26 driving the downstream compressor 24.

Figure 2C:
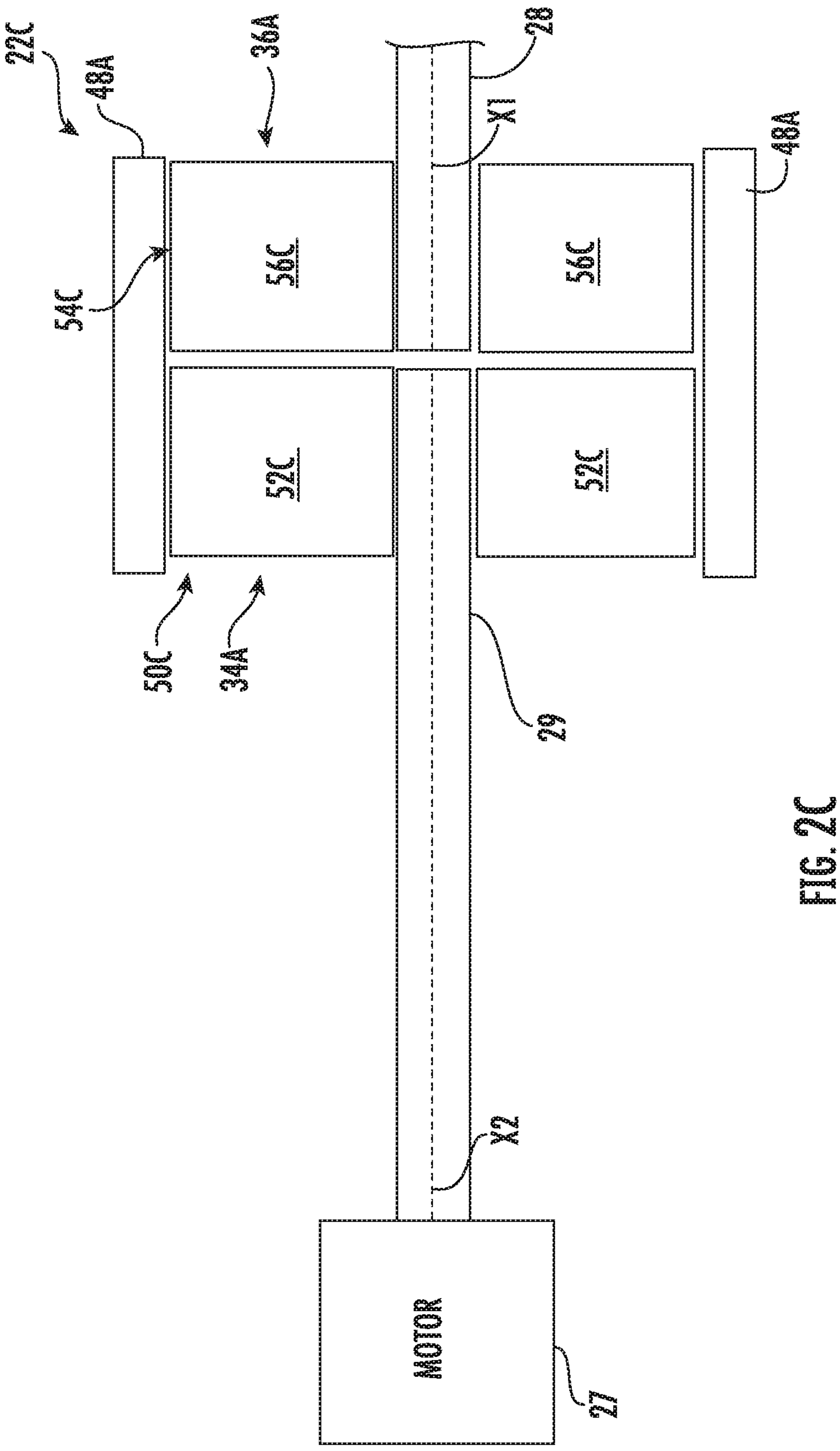
FIG. 2C schematically illustrates another example axial compressor for use with the compressor assembly of FIG. 1C.

FIG. 2C illustrates another example configuration of an axial compressor 22C similar to the axial compressor 22 except where described below or shown in the Figures. The axial compressor 22C includes a first vaneless stage 50C having a set of circumferentially spaced rotor blades 52C and a second vaneless stage 54C having a set of circumferentially spaced rotor blades 56C. The first vaneless stage 50C is immediately adjacent the second vaneless 54C such that as the refrigerant R passes over the rotor blades 52C, the refrigerant R will immediately reach the rotor blades 56C. Additionally, the first and second vaneless stages 50C, 54C rotate in opposite rotational directions with the first vaneless stage 50C being driven by the motor 27 through the drive shaft 29 and the second vaneless stage 54C being driven by the motor 26 through the driveshaft 28. The axial compressor 22C could also contain more than two vaneless stages.

Figure 3:
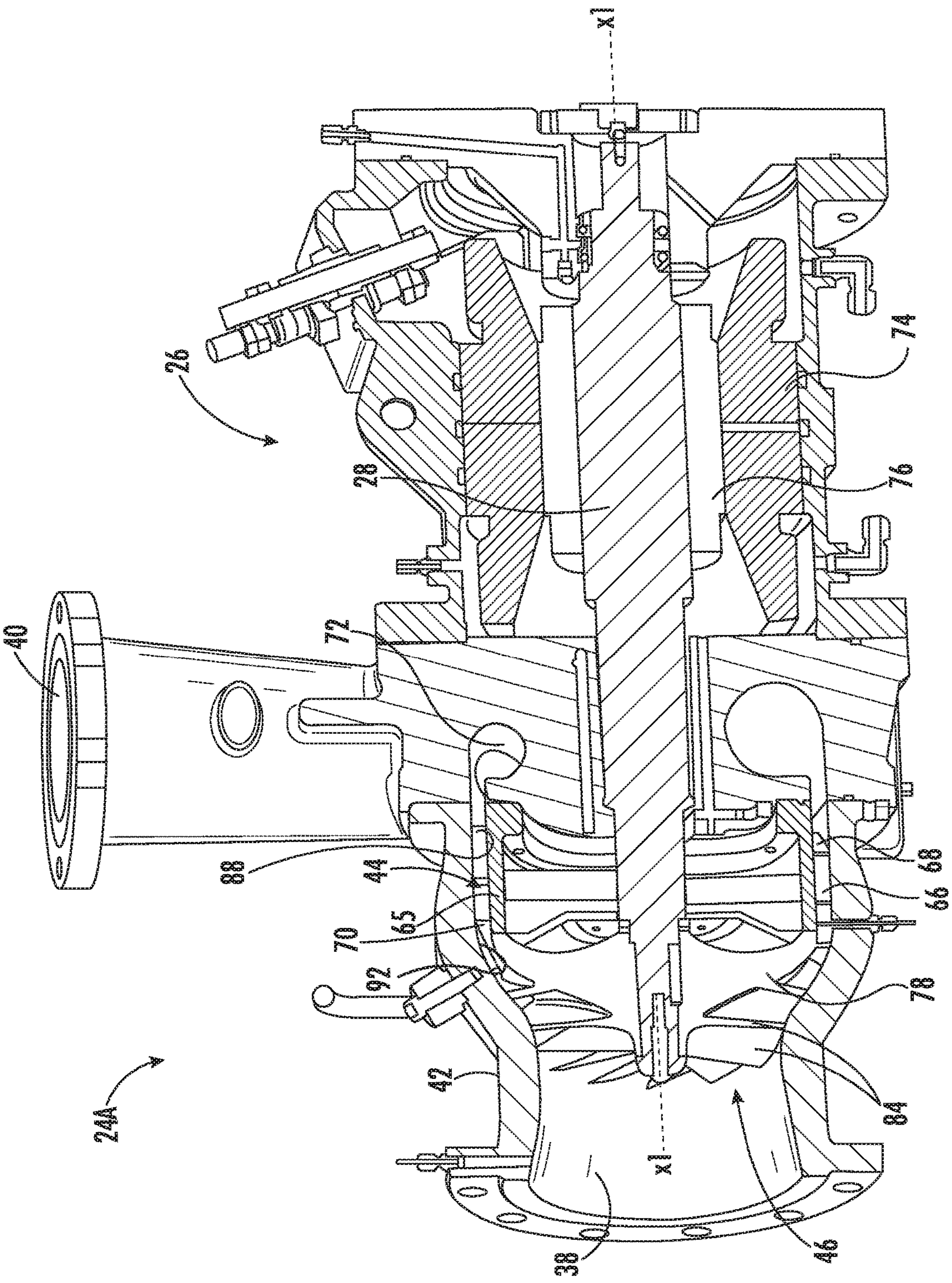
FIG. 3 illustrates an example mixed-flow compressor.

FIG. 3 illustrates one example of the downstream compressor 24, such as a mixed-flow compressor 24A attached to the motor 26. In the illustrated example, the mixed-flow compressor 24A includes a main casing or housing 42 that at least partially defines the inlet 38 into the mixed-flow compressor 24A for receiving refrigerant and the outlet 40 for discharging the refrigerant R from the mixed-flow compressor 24A. The mixed-flow compressor 24A draws the refrigerant R towards the inlet 38 by rotating a mixed-flow impeller 46 immediately downstream of the inlet 38. The impeller 46 then directs the refrigerant R to a diffuser section 44 located axially downstream of the impeller 46.

Figure 5:
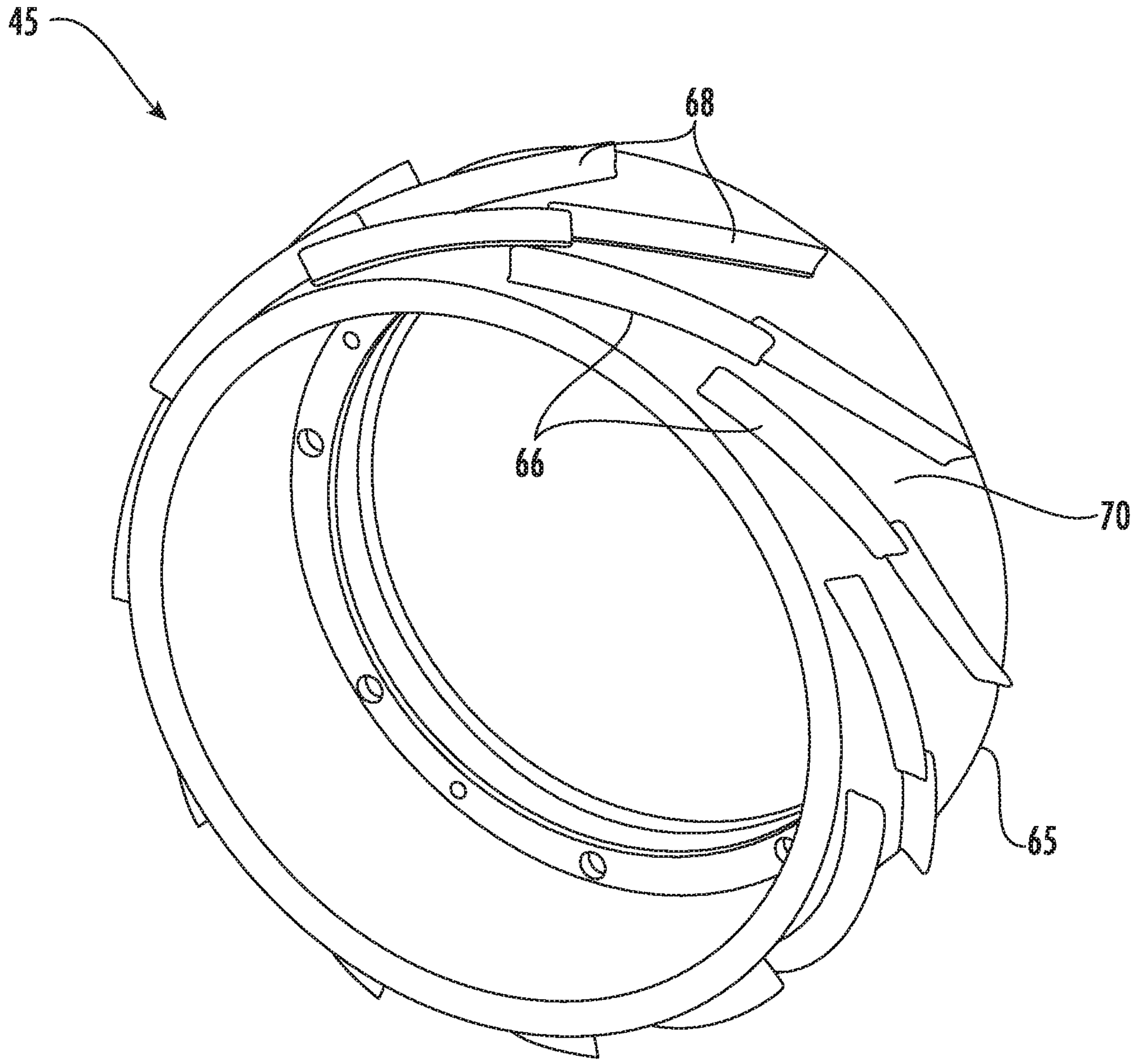
FIG. 5 illustrates an example diffuser in the mixed-flow compressor of FIG. 4.

The diffuser section 44 includes a diffuser 45 (FIG. 5) with a hub 65 with a first row of circumferential vanes 66 and a second row of vanes 68 extending radially outward from a radially outer surface of the hub 65. The hub 65 forms a fluid passageway 70 with a portion of the housing 42 to direct the refrigerant R into a volute 72 before being redirected from the axial direction to a radial direction outward toward the outlet 40 of the mixed-flow compressor 24A.

The mixed-flow compressor 24A is driven by the motor 26 connected to the impeller 46. In the illustrated example, the motor 26 includes a stator 74 attached to a portion of the housing 42 that surrounds a rotor 76 attached to the drive shaft 28. The drive shaft 28 is configured to rotate about the rotational axis X1. The axis of rotation X1 is common with the impeller 46, the rotor 76, and the drive shaft 28 and is common with a central longitudinal axis extending through the housing 42.

Figure 4A:
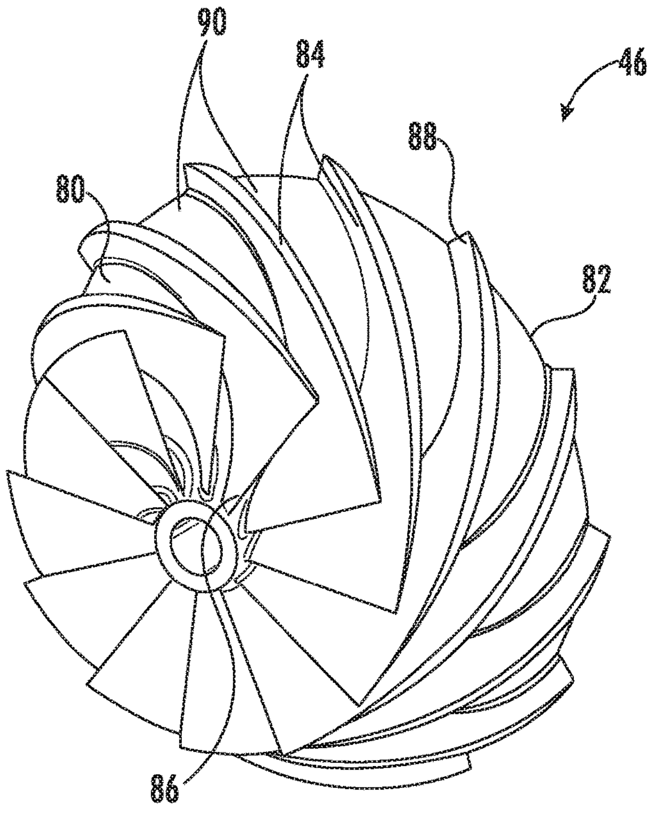
FIG. 4A illustrates a front perspective view of an impeller of the mixed-flow compressor of FIG. 3.
Figure 4B:
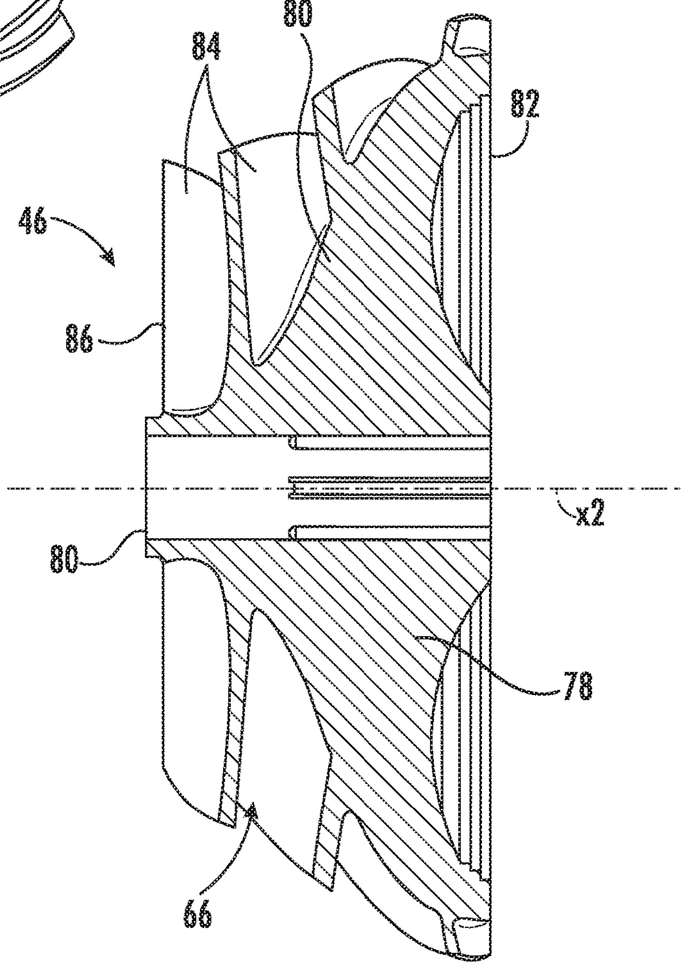
FIG. 4B is a cross-sectional view of the impeller of FIG. 4A.

As shown in FIGS. 4A and 4B, the impeller 46 includes a hub or body 78 having a front side 80 and back side 82. As shown, the diameter of the front side 80 of the body 78 generally increases toward the back side 82, such that the impeller 46 is generally conical in shape. A plurality of blades 84 extend radially outward from the body 78 relative to the axis of rotation X1. Each of the plurality of blades 84 is arranged at an angle to the axis of rotation X1 of the drive shaft 28. In one example, each of the blades 84 extends between the front side 80 and the back side 82 of the impeller 46. As shown, each of the blades 84 includes an upstream end 86 adjacent the front side 80 and a downstream end 88 adjacent the back side 82. Further, the downstream end 88 of the blade 84 is circumferentially offset from the corresponding upstream end 86 of the blade 84.

A plurality of passages 90 is defined between adjacent blades 84 to discharge a fluid passing over the impeller 46 generally parallel to the axis X1. As the impeller 46 rotates, fluid approaches the front side 80 of the impeller 46 in a substantially axial direction and flows through the passages 90 defined between adjacent blades 84. Because the passages 90 have both an axial and radial component, the axial flow provided to the front side 80 of the impeller 46 simultaneously moves both parallel to and circumferentially about the axis X1 of the drive shaft 28. In combination, an inner surface 92 (shown in FIG. 4) of the housing 42 and the passages 90 of the impeller 46 cooperate to discharge the compressed refrigerant R from the impeller 46 to the diffuser section 44. In one example, the compressed refrigerant is discharged from the impeller 46 at an angle relative to the axis X1 of the drive shaft 28 into the diffuser section 44.

Figure 6:
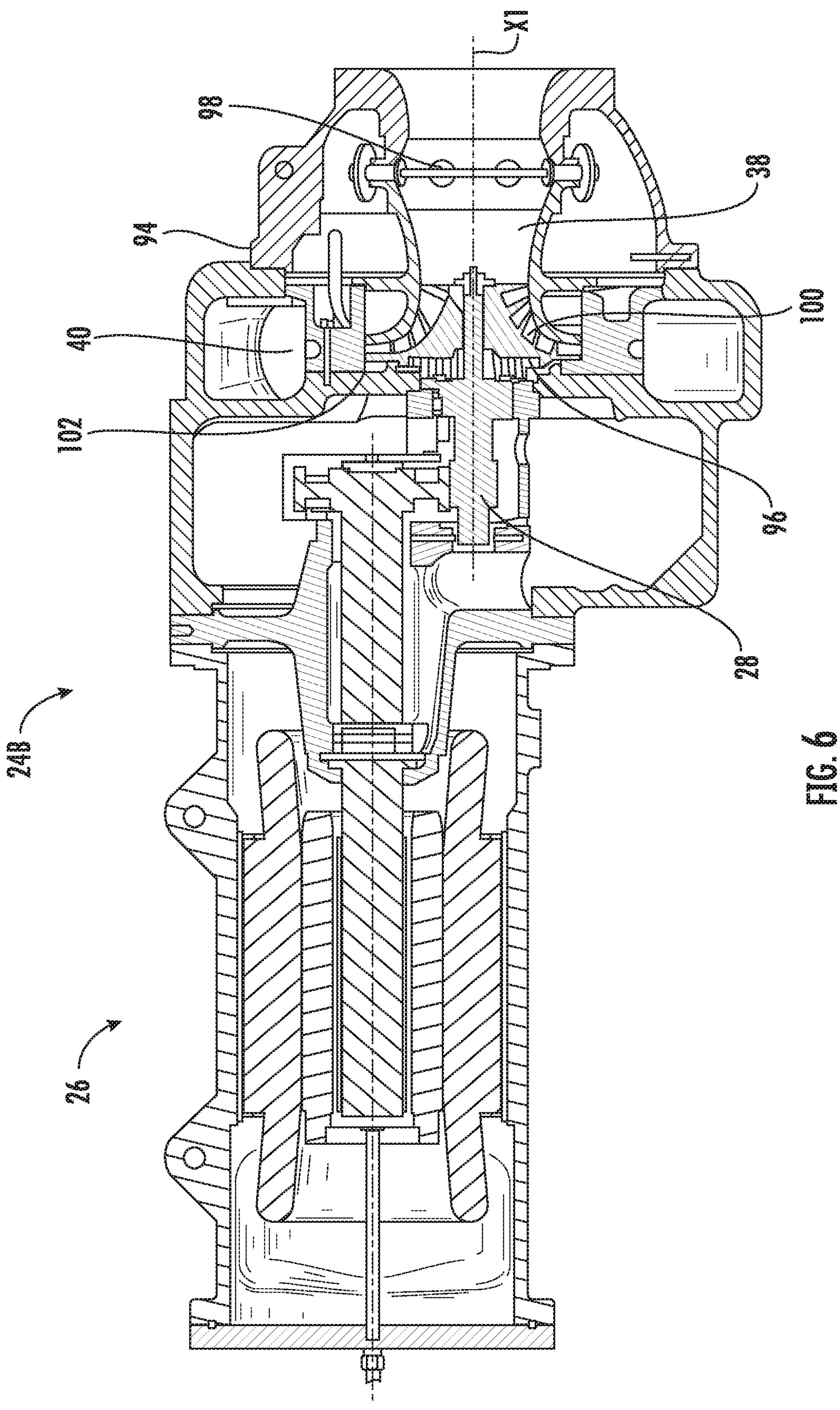
FIG. 6 illustrates an example centrifugal compressor.

FIG. 6 illustrates another example downstream compressor 24, such as a centrifugal compressor 24B. As shown, the centrifugal compressor 24B includes a main casing 94 having the inlet 38 that directs the refrigerant R into a rotating centrifugal impeller 96 through a series of adjustable inlet guide vanes 98. The impeller 96 is secured to the drive shaft 28 by any suitable means to align impeller 96 along the axis X1 of the centrifugal compressor 24B and driven by the motor 26. The impeller 96 has a plurality of passages 100 formed therein that cause the incoming axial flow of the refrigerant to turn in a radial direction and discharge into an adjacent diffuser section 102. The diffuser section 102 is disposed generally circumferentially about the impeller 96 and functions to direct the compressed refrigerant R into the outlet 40.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary examples, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A refrigerant compressor assembly comprising:

an axial compressor including at least one axial stage, wherein the at least one axial stage includes a first vaneless stage immediately upstream of a second vaneless stage, and wherein the first vaneless stage is configured to rotate in a first rotational direction and the second vaneless stage is configured to rotate in a second rotational direction;

a downstream compressor located fluidly downstream of the axial compressor and including one of a mixed-flow impeller or a centrifugal impeller;

at least one motor in driving engagement with the axial compressor and the downstream compressor, wherein the at least one motor is axially spaced from the mixed-flow impeller or the centrifugal impeller, and wherein that at least one motor includes a first motor for driving the first vaneless stage and the downstream compressor, and a second motor for driving the second vaneless stage.

2. The assembly of claim 1, further comprising a transmission mechanically connecting the at least one axial stage and the at least one motor.

3. The assembly of claim 1, wherein the downstream compressor is a mixed-flow compressor and the mixed-flow impeller includes a hub and a plurality of impeller blades extending outward from the hub.

4. The assembly of claim 3, wherein the mixed-flow compressor includes a diffuser downstream of the mixed-flow impeller.

5. The assembly of claim 4, wherein the diffuser includes at least one row of circumferentially spaced diffuser vanes.

6. The assembly of claim 4, wherein the diffuser includes a first row of circumferentially spaced diffuser vanes and a second row of circumferentially space diffuser vanes located axially downstream of the first row of circumferentially spaced diffuser vanes.

7. The assembly of claim 1, wherein refrigerant drawn into an inlet on the axial compressor is compressed by the axial compressor and travels through an outlet on the axial compressor to an inlet on the downstream compressor, and wherein the refrigerant is further compressed in the downstream compressor before being discharged through an outlet on the downstream compressor.

8. The assembly of claim 1, wherein:

the first motor drives the second vaneless stage and the second motor drives the downstream compressor independently of the first motor.

9. A refrigerant compressor assembly comprising:

an axial compressor including at least one axial stage, wherein the at least one axial stage includes a first vaneless stage immediately upstream of a second vaneless stage, and wherein the first vaneless stage is configured to rotate in a first rotational direction and the second vaneless stage is configured to rotate in a second rotational direction;

a downstream compressor located fluidly downstream of the axial compressor and including one of a mixed-flow impeller or a centrifugal impeller; and at least one motor in driving engagement with at least one of the axial compressor and the downstream compressor, wherein that at least one motor includes a first motor for driving the first vaneless stage and a second motor for driving the second vaneless stage, and wherein the second motor drives the downstream compressor.

10. A method of operating a refrigerant compressor assembly comprising the steps of:

compressing a refrigerant with an axial compressor including at least one axial stag; wherein the at least one axial stage includes at least a first vaneless stage and a second vaneless stage;

compressing the refrigerant with a downstream compressor located fluidly downstream of the axial compressor and the downstream compressor includes one of a mixed-flow impeller or a centrifugal impeller;

driving the axial compressor and the downstream compressor with at least one motor, wherein the at least one motor is axially spaced from the mixed-flow impeller or the centrifugal impeller; and wherein the at least one motor comprises at least a first motor and a second motor, and including driving the first vaneless stage and the downstream compressor in a first rotational direction with the first motor, and driving the second vaneless stage in a second rotational direction with the second motor.

11. The method of claim 10, wherein the downstream compressor is a mixed-flow compressor and the refrigerant exiting the mixed-flow impeller is diffused with a diffuser.

12. The method of claim 11, wherein the diffuser includes at least one row of circumferentially spaced diffuser vanes.

13. The method of claim 10, wherein a first axial stage of the at least one axial stage compresses the refrigerant with a pressure ratio of 1.2 to 2.0.

14. The method of claim 13, wherein the downstream compressor compresses the refrigerant with a pressure ratio of 2.0 to 6.5.

15. The method of claim 10, wherein:

the at least one motor comprises the first motor and the second motor, and including driving the second vaneless stage with the first motor and driving the downstream compressor with the second motor independently of the first motor.

16. A method of operating a refrigerant compressor assembly comprising the steps of:

compressing a refrigerant with an axial compressor including at least one axial stage, and wherein the axial compressor includes at least a first vaneless stage and a second vaneless stage;

driving the first vaneless stage in a first rotational direction with a first motor and driving the second vaneless stage in a second rotational direction with a second motor; and compressing the refrigerant with a downstream compressor located fluidly downstream of the axial compressor and the downstream compressor includes one of a mixed-flow impeller or a centrifugal impeller, and wherein the downstream compressor is driven by the second motor.

* * * * *